(No Model.) 2 Sheets—Sheet 1.

C. J. REED.
STORAGE BATTERY.

No. 504,455. Patented Sept. 5, 1893.

Witnesses
C. E. Ashley
H. W. Lloyd

Inventor
Charles J. Reed
By his Attorney
Charles J. Kintner (No Model.) 2 Sheets—Sheet 2
C. J. REED.
STORAGE BATTERY.
No. 504,455. Patented Sept. 5, 1893.
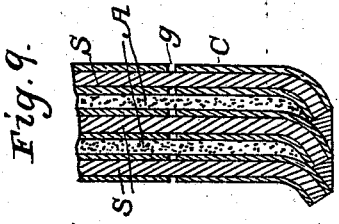
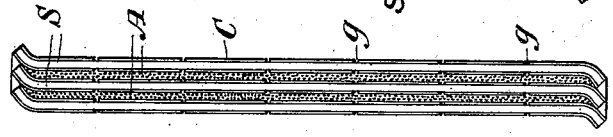
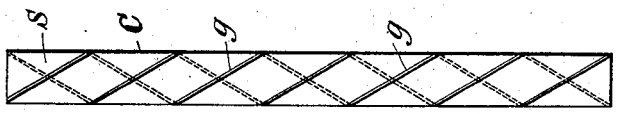
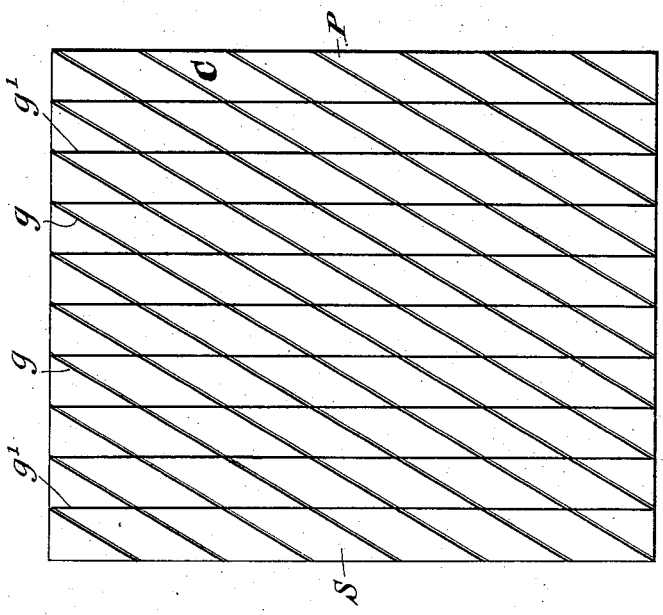
Witnesses
C. E. Ashley
H. W. Lloyd.
Inventor
Charles J. Reed
By his Attorney
Charles J. Kintner

UNITED STATES PATENT OFFICE.

CHARLES J. REED, OF ORANGE, NEW JERSEY.

STORAGE-BATTERY.

SPECIFICATION forming part of Letters Patent No. 504,455, dated September 5, 1893.

Application filed March 2, 1893. Serial No. 464,353. (No model.)

*To all whom it may concern:*

Be it known that I, CHARLES J. REED, a citizen of the United States, residing at Orange, in the county of Essex and State of New Jersey, have made a new and useful Invention in Electrical Storage-Batteries or Accumulators, of which the following is a specification.

My invention is directed particularly to improvements in storage batteries or accumulators of the Planté type in which the active material is formed upon the surface of the electrode either by electrical, chemical, or any of the well known processes, and to this end my invention has for its objects: first, the production of an electrode or element for a storage battery of this type having great active surface and occupying a minimum space thereby materially decreasing the weight of each element: second, the construction of each electrode or element in such a manner as to give it great stability, whereby when the battery is complete it is adapted for use in electric railway propulsion or in kindred places generally where accumulators are subjected to severe strains either of a mechanical or electrical nature: third, the construction of an electrode of very low internal resistance, thereby giving to the battery when complete large efficiency.

To this end my invention consists in the method of construction and the electrode constructed in accordance with said method as hereinafter described, the essentially novel features of the entire invention both as to the method of structure and the article so constructed being particularly pointed out in the claims at the end of this specification.

For a full, clear and exact understanding of my invention reference is had to the accompanying drawings in all of which like letters of reference represent like parts wherever used.

Figure 5:
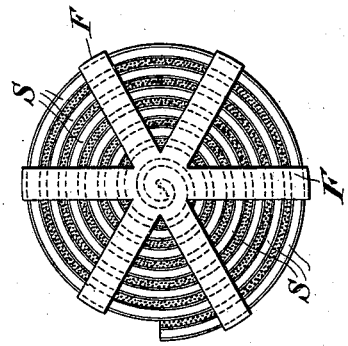
Figure 4:
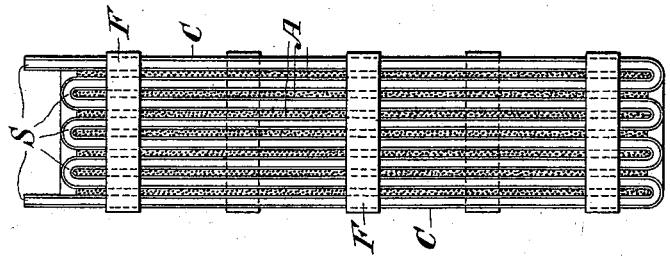
Figure 3:
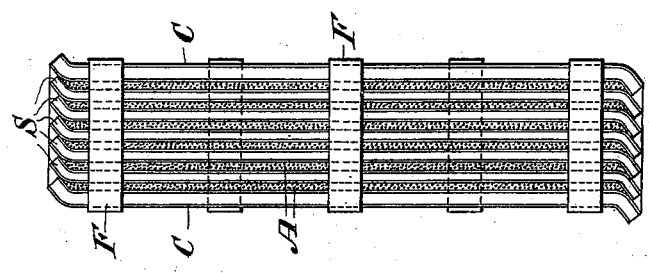
Figure 2:
Figure 1:
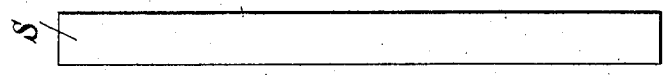

Figure 1 of the drawings is a side elevational view of a narrow thin strip of material as sheet lead from which the electrode is to be prepared. Fig. 2 is an edge view thereof showing the active coatings on the opposite faces. Fig. 3 is a side elevational view of one form of my improved electrode or element complete. Fig. 4 is a similar view of a modified form thereof. Fig. 5 is a similar view of a third modified form. Fig. 6 is a side elevational view of an enlarged plate of material from which an electrode is to be prepared, illustrating my novel method of preparing the active surface or coating and afterward removing the coating in diagonal lines and then separating the plate into strips. Fig. 7 is a side elevational view of a series of such strips resting back to back with the diagonal grooves crossing each other between the strips, and Fig. 8 is a view illustrating the same type of grooved strips with intervening absorbent material, the element or electrode being in all respects like that shown in Fig. 3 save as to the grooved feature shown also in Figs. 6 and 7. Fig. 9 is a sectional view of Fig. 8.

I will now describe the method of constructing my improved element or electrode.

I take strips or sheets S of lead or equivalent material adapted to become active under the agency of electrical currents or various chemical processes well known in the art under the general type of the Planté process and subject these strips or sheets to such processes, thereby forming the usual active coating upon the strips illustrated by the letters C C in all of the figures of the drawings which show coatings. I then assemble the strips together with their coated surfaces C C lying adjacent to each other but preferably separated by any well known absorbent material A as asbestos or blotting paper or the like which will not be liable to set up local action between the strips. The strips are all held or bound closely together with such absorbent material, by placing it as shown in Fig. 3 between them and surrounding the entire mass by binding strips F F of lead or equivalent material located at the required distances apart and then the ends of the strips S are all turned over so that they make good metallic contact with each other and either brazed or soldered together as shown at the upper and lower ends of Fig. 3.

Instead of using the binding strips F F the strips C may be separated by interwoven threads of asbestos wound between and around each and every strip binding the entire mass firmly together, the ends of the strips being united as before, into one integral mass of good conductivity.

In the structure shown in Fig. 4 the strip S is of one continuous piece of material first coated in the manner indicated with the active coating C and then bent back and forth upon itself in zigzag form with absorbent material A between each layer thereof, the entire mass being bound together by lead strips F as before, or by the fibrous thread like material as already described.

Fig. 5 shows still another form of electrode or element in which the strip S is rolled upon itself in the form of a watch spring with an intermediate layer of absorbent material as before, the outer edges of the strips and the entire mass being bound together by radial strips F on opposite sides. Each element or electrode when constructed as described would be provided with the usual lugs or ears for the necessary contacts and said element would be united in the battery solution in pairs in the usual manner as is well understood by those skilled in the art.

As a method of rapidly forming strips for electrodes, I prefer to proceed as is indicated in Figs. 6 and 7 of the drawings. In this instance I take a thin plate of lead P or equivalent material of the full length of the electrode and subject the entire plate to a forming process after the Planté method or process or any of the well known analogous methods or processes and after the plate P is thus formed I cut diagonally disposed grooves $g\ g$ in the opposite faces thereof to the depth of the coating thus formed. Immediately after I divide the plate P into strips S of the thickness it is desired to construct the element by cutting grooves $g'\ g'$ either entirely through it so as to separate it into individual strips or to sufficient depths on opposite sides to permit the strips to be folded back and forth upon themselves so that the diagonal grooves $g$ of one strip on one side will cross the diagonal grooves $g$ on the other side as is illustrated in Fig. 7. The usual absorbent material A is interposed between the strips as shown in Fig. 8 if preferred and the upper and lower ends of said strips bent over and brazed or soldered together as shown in Fig. 8. I prefer however to use individual strips distinctly disconnected from each other except at their ends as shown in Fig. 8 and to bind them together with intermediate leaden strips F as shown in Figs. 3 and 4 or with interwoven absorbent material as already described. The grooves $g\ g$ in the opposite faces of the coated strips S permit of a free intermingling of the battery fluid throughout the body of the electrode and this particularly when they are arranged as shown in Fig. 7. With such an arrangement the absorbent material A may be done away with if preferred or if better circulation is desired it may be interposed after the manner shown in Fig. 8. By constructing an electrode or element in the manner described I am enabled to obtain a very large active surface within a correspondingly small space or area.

Having thus described my invention, what I claim, and desire to secure by Letters Patent of the United States, is—

1. The described method of preparing the material for an electrode for a secondary or storage battery consisting in forming an active coating on the opposite faces of a sheet of lead or equivalent conducting material and then cutting grooves in the coatings and afterward cutting it into strips of the desired width.

2. An electrode for a secondary or storage battery made up of a series of thin flat strips of lead or equivalent conducting material having an active coating on their opposite faces, the strips being provided with grooves in the active coatings for admitting the battery liquid, in combination with a binding medium for binding said strips together substantially as described.

3. An electrode for a secondary or storage battery consisting of a series of thin narrow strips of lead or equivalent conducting material having active coatings on their opposite faces, the opposite ends of the strips being bound together and the intermediate portions held together by a binding medium substantially as described.

In testimony whereof I have hereunto subscribed my name this 1st day of March, 1893.

CHARLES J. REED.

Witnesses:
C. J. KINTNER,
M. M. ROBINSON.